Patented Nov. 10, 1936

2,060,716

UNITED STATES PATENT OFFICE 2,060,716

SYNTHETIC RESINS

James Augustus Arvin, Wilmington, Del., assignor to E. I. du Pont de Nemours & Company, Wilmington, Del., a corporation of Delaware No Drawing. Application March 22, 1935, Serial No. 12,517. Renewed July 9, 1936

11 Claims. (Cl. 260—2)

This invention relates to the manufacture of resins and more particularly to a new process for making polyether resins of the kind described in my application, Serial Number 651,634, filed January 13, 1934.

In the mentioned application I have disclosed new resins termed polyether resins since they are composed of the recurring groups —X—O—Y—O— where X is a bivalent organic radical whose atoms adjacent to oxygen are aromatic carbon atoms, O is oxygen, and Y is a bivalent organic radical whose atoms adjacent to oxygen are joined to other atoms by single bonds only. These resins are made by condensing the alkali or alkaline earth metal salts of polyhydric phenols with polyhalides whose halogen atoms are attached to different aliphatic carbon atoms joined in turn to other atoms by single bonds only. The present invention is primarily concerned with an improved method of making resins of the kind just mentioned.

This invention has as an object a method for making polyether resins which very materially reduces the time required for completing the condensation reaction. Another object is the application of a process to the manufacture of polyether resins which improves certain properties of the resins. Another object is the manufacture of improved resinous compositions. Other objects will appear hereinafter.

The present invention is based upon the discovery that the rate of reaction between salts of polyhydric phenols and aliphatic polyhalides of the type referred to above is markedly accelerated by small amounts of amines.

The objects of this invention are accomplished by carrying out the polyether resin condensation in the presence of catalytic amounts of amines in the manner described more fully hereinafter.

In the preferred embodiment of the invention, the polyhydric phenol is mixed with an aqueous solution of the theoretical or a slightly excess quantity of alkali, the amine catalyst is added, the mixture brought to reflux, and an equivalent amount of the aliphatic polyhalide introduced. The temperature should be above 70° C. and preferably above 100° C. The apparatus preferably consists of a vessel fitted with a thermometer, reflux condenser, and a stirrer designed to sweep the sides and bottom of the vessel. Heating is continued until the desired state of condensation is obtained or until as much of the phenol and polyhalide are reacted as possible. The phenol is largely reacted when the titration value of the mixture remains substantially constant; where the theoretical amount of alkali was originally used, the product is substantially neutral. In view of the fact that side reactions occur, this method of following the progress of the resinification reaction is only approximate. The reaction can also be followed by distilling off a few drops of the reaction mixture and examining the cold distillate. If the distillate is cloudy, some of the polyhalide is uncombined and refluxing is continued. When the distillate is clear, the water can be distilled off without loss of polyhalide; this will then permit the use of higher temperatures in the later stages of the reaction with a resultant further decrease in the time of preparation. Additional heating after the distillate becomes clear is generally necessary, inasmuch as this clear point shows that essentially all of the polyhalide has combined by elimination of at least one of its halogen atoms, but not necessarily all of them. The final reaction product is generally very viscous, and is opaque because of occluded salt. When the reaction mixture has reached the desired degree of condensation, or when the alkali number of the reaction mixture approaches constancy, the mixture is taken up with a small amount of an aromatic hydrocarbon solvent, e. g., toluene, and poured on to trays, most of the toluene distilled off, the product allowed to cool, transferred to a steam-jacketed Werner-Pfleiderer mixer, washed with hot water until salt-free, then treated with dilute hydrochloric acid, and finally washed free of chlorides with hot water. The resin is then dried either in a vacuum oven or at atmospheric pressure in a steam-jacketed Werner-Pfleiderer mixer. The amine added to catalyze the reaction generally distills off during the second stage of the condensation.

The polyether resins of this invention may also be made by direct condensation at superatmospheric pressures of the aliphatic polyhalide with the polyhydric phenol in the presence of the amine catalyst. The resinification may also be carried out in the presence of the amine catalyst and a diluent, e. g., xylene, chlorobenzene, high boiling aliphatic hydrocarbons, etc., with or without superatmospheric pressures, in accordance with methods more fully described in my mentioned co-pending application.

It should be understood that the amine catalyst cannot be used in substitution of the sodium hydroxide in the above description but must be used in addition to the alkali present in the reaction mixture which forms the alkali or alkaline earth metal salt of the phenol.

The following examples are illustrative of methods for practicing my invention:

Example I

| | Parts by weight |
|---|---|
| (A) Sodium hydroxide (48.3% solution) | 971.8 |
| (B) Water | 1246.0 |
| (C) 2,2-bis(4 - hydroxyphenyl) - dimethyl methane | 1314.0 |
| (D) Diethylamine | 8.3 |
| (E) $\beta,\beta'$-dichlordiethyl ether | 825.0 |

Ingredients A, B, C and D were placed in the order named in the reaction vessel, and heated to reflux with stirring. Ingredient E was then added over a period of ten minutes and the mixture refluxed for 7.5 hours, at the end of which time substantially all of the $\beta,\beta'$-dichlordiethyl ether had reacted. Water was then distilled off over a period of about 6.5 hours, meanwhile the the temperature rising to 235° C. where it was held for approximately 11 hours with stirring. During this period the reaction mixture may be blanketed with steam or an inert gas such as nitrogen to prevent dicoloration. The hot resin was poured out of the reaction vessel, allowed to cool to room temperature, broken into small pieces and transferred to a steam-jacketed Werner-Pfleiderer mixer and washed, first with water, then with dilute hydrochloric acid, and finally with hot water until substantially free of chloride ion. The washed resin was then dried by heating it for five hours in a vacuum oven at about 115° C. The product obtained was a light-colored resin, completely soluble in aromatic hydrocarbon solvents, and which on being heated had no tendency to be converted to an infusible, insoluble product.

The first stage of condensation in a similar resin made without the diethylamine required 17.5 hours for completion, as compared to 7.5 in the above example.

Example II

The following example illustrates the use of amine catalysts in the synthesis of polyether resins, withholding a portion of the alkali from the first stage of the condensation.

| | Parts by weight |
|---|---|
| (A) Sodium hydroxide (48.3% solution) | 846.4 |
| (B) Water | 1157.0 |
| (C) 2,2-bis(4 - hydroxyphenyl) - dimethyl methane | 1314.0 |
| (D) Diethylamine | 8.3 |
| (E) $\beta,\beta'$-dichlordiethyl ether | 825.0 |

Ingredients A, B, C and D were placed in the order named in the reaction vessel, and heated to refluxing with stirring. Ingredient E was then added slowly, and refluxing continued for about 15 hours, at the end of which time substantially all of the $\beta,\beta'$-dichlordiethyl ether had reacted. At this point 149.36 parts of sodium hydroxide solution (48.3%) was added, water distilled off, and the temperature allowed to rise gradually to 235° C. where it was held for two hours. The resin was poured on an enameled plate while still hot, allowed to cool to room temperature, broken up into small pieces, transferred to a steam-jacketed Werner-Pfleiderer mixer, washed with water, then with dilute hydrochloric acid, and finally with hot water until free of chlorides. The washed resin was dried by heating it overnight in a vacuum oven at 110° C. The resin obtained was a light-colored brittle material having no tendency to harden to an insoluble, infusible product after prolonged heating.

A similar resin made without diethylamine catalyst required 30 hours for completion of the first stage of the condensation, as against about 15 hours in the above example.

The following examples illustrate further steps in the process for making the above resins, these steps being in many instances desirable for the purpose of increasing the toughness and viscosity of the resins. These steps involve continual removal of the volatile products condensed in the resins until a resin of the desired toughness and viscosity is obtained. For this purpose the molecular still described in application Serial Number 548,701, filed July 3, 1931 by W. H. Carothers may be used as in Examples III and IV below.

Example III

A ten-gram sample of the resin of Example I was heated for 36 hours at 240–250° C. at 0.5 mm. pressure in the "molecular still" described in the application just referred to. The bubble-tube viscosity of the resin in 50% toluene solution was found to have been increased by this treatment from 40 seconds to 165 seconds at 77° F. Films of the treated resin were also markedly tougher than those of the untreated resin.

Example IV

A fifteen-gram sample of the resin of Example II was heated for 88 hours at 200–215° C. at 0.5 mm. pressure in the "molecular still" described in the application just referred to. The bubble-tube viscosity of a 35% toluene solution of the resin was found to have been raised by this treatment from 55 seconds to 194 seconds at 77° F. Films of the treated resin were markedly tougher than those of the untreated resin.

Another method which may be used for the same purpose is that of fractionation given in Example V below.

Example V

To a solution of sixty-five grams of the resin of Example II in 544 grams of toluene was added drop by drop with stirring 220 grams of ethyl alcohol, the mixture transferred to a separatory funnel, and allowed to stand until two layers separated. The lower layer was then drawn off and evaporated to dryness. The resin recovered therefrom had a bubble-tube viscosity in 35% toluene solution of 95 seconds as compared to 55 seconds at 77° F. for the untreated resin. Films of the treated resin were definitely tougher than those of the untreated resin.

As shown by the foregoing three examples, the viscosity of the resins may be increased at least 50%.

In place of the $\beta,\beta'$-dichlordiethyl ether of the examples, other aliphatic polyhalides containing at least two halogen atoms attached to different carbon atoms which are in turn joined to other atoms by single bonds only may be used. Examples of these include dichloroacetone, symmetrical dichloromethyl ether, 2,3-dichlorodioxan, etc., as well as any of the polyhalides disclosed in my above mentioned application 651,634. The phenols mentioned in that application, such as resorcinol, p,p'-dihydroxydiphenyl and dihydroxybenzophenone, di(4-hydroxyphenyl)sulfone, etc., may likewise be used in place of the phenol mentioned in the examples, the most useful phenols being generally of the formula

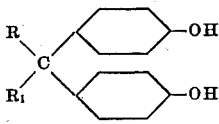

Phenols particularly valuable in the practice of the present invention are those obtained by condensing naphthanones with mononuclear monohydric phenols having the para position unsubstituted; those obtained by the self-condensation of a naphthol, preferably in the presence of an oxidizing agent; and those obtained by the condensation of an aldehyde with a naphthol, preferably the product obtained by condensing one mol. of formaldehyde with two mols of beta-naphthol. These phenols contain at least four carbocyclic nuclei, at least two of which are condensed, and the phenolic hydroxyl groups are attached to different carbocyclic nuclei. Examples are 2,2-bis (4 - hydroxyphenyl) - decahydronaphthalene, bis (beta-naphthol), and bis(2-hydroxynaphthyl)-methane. Another type of phenol from which high softening resins are obtained in accordance with the present process includes 1,1-bis(4-hydroxyphenyl)methylcyclohexane, and others of the general formula

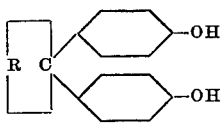

where R is a cyclohexane residue containing one or more alkyl substituents.

The preferred amines for the purpose of this invention are diethylamine, n-propylamine, di-n-propylamine, triethylamine, and n-butylamine, but additional amines that may be used as catalysts include dimethyl and trimethylamines, tributyl and triamylamines, naphthylamines, p-phenylenediamine, dinaphthylamine, diphenylamine, diamylamine, cyclohexyl, and dicyclohexylamines, aniline, methyl and dimethyl aniline, pyridine, quinoline, piperidine, etc.

Potassium hydroxide and the various other alkalies mentioned in my application 651,634 may be used instead of the sodium hydroxide mentioned in the above examples.

In the case of gaseous amines, e. g., methyl amine, a slow stream of the amine is passed through the reaction mass during the first stage.

While the presence of the amines in any appreciable amount will affect the reaction more or less favorably, I prefer, however, to use between 0.01 and 0.05 mol. of the amine per mol. of the aliphatic polyhalide. It will be understood that the expression for the amount of amine is arbitrary since this amount could just as well be expressed in terms of the polyhydric phenol or of the combined proportion of polyhydric phenol and polyhalide.

The resins of the present invention are particularly useful as coating compositions, either alone or associated with the various other ingredients specifically disclosed in the mentioned application Serial Number 651,634. They are also useful in plastics; as binders for mica in the manufacture of insulating materials; as sandwiching material or adhesive therefor in making shatter-proof glass; as binders for sheets of cellulose acetate, paper, and the like in the manufacture of laminated sheet and tube products; adhesives and thermoplastic cements and sealing waxes for general use; impregnating, coating, sizing, glazing, or waterproofing agents for linoleum, rubber, regenerated cellulose, cellulose ethers and esters, fabrics, paper, porous stone, leather, artificial leather, rubber-coated fabrics (which may also have a coat of oil varnish), wood, wood pulp, etc.; binders for linoleum plastics; formulation of printing inks; manufacture of artificial fibers; glass substitutes; and motion picture film. Thin sheets of the resins are so tough, flexible and tear-resistant that they may be used as substitutes for thin transparent sheets of regenerated cellulose.

An important advantage of the present invention resides in the reduced time required for completion of the first stage of the condensation, without in any way sacrificing the excellent properties of the resulting polyether resins. This reduction in the time required for completion of the first stage of the condensation operates to reduce cost, and thus make the resins more practical from a commercial standpoint.

The method described herein is particularly useful in the case of the process involving the use of a deficiency of alkali in the first stage of the condensation because by withholding alkali the time required for completion of the first stage is about doubled, but the resulting resins, even in the absence of the further treatment of Examples III, IV, and V are tougher than similar resins made by the conventional process of adding all of the alkali at the beginning. Through the use of an amine catalyst, e. g., diethylamine, the time required for completion of the first stage of the condensation is reduced to about one-half of that required without the catalyst. This is very important from the commercial standpoint.

As many apparently widely different embodiments of this invention may be made without departing from the spirit and scope thereof, it is to be understood that I do not limit myself to the specific embodiments thereof except as defined in the appended claims.

I claim:

1. The process of synthesizing polyether resins which comprises reacting in polymerizing proportions in an alkaline medium and in the presence of an amine catalyst, a polyhydric phenol and an aliphatic polyhalide in which the halogen atoms are all attached to different carbon atoms which are in turn joined to other atoms by single bonds only.

2. The process for synthesizing polyether resins which comprises reacting in polymerizing proportions and in the presence of an amine catalyst the alkali metal salt of a polyhydric phenol with an aliphatic polyhalide in which the halogens are all attached to different carbons which are in turn attached to other atoms by single bonds only.

3. The process set forth in claim 2 in which the alkali metal salt of the polyhydric phenol is the sodium salt.

4. The process of synthesizing polyether resins which comprises reacting in polymerizing proportions and in the presence of an amine catalyst the alkali metal salt of a dihydric polynuclear phenol of the general formula

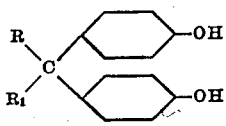

where R is hydrogen, alkyl, or aryl and $R_1$ is alkyl or aryl with an aliphatic polyhalide in which the halogen atoms are all attached to different carbon atoms which are in turn joined to other atoms by single bonds only.

5. The process set forth in claim 4 in which the alkali metal salt of the polyhydric phenol is the sodium salt.

6. The process set forth in claim 2 in which the amine is an aliphatic secondary amine.

7. The process set forth in claim 2 in which the amine is diethylamine.

8. A process for making resins which comprises reacting in polymerizing proportions and in the presence of an amine catalyst the alkali metal salt of a polyhydric phenol with an aliphatic polyhalide in which the halogen atoms are all attached to different carbon atoms which are in turn joined to other atoms by single bonds only, and further treating the reaction product to increase the viscosity and toughness of the resin by substantially completely removing its volatile by-products.

9. A process for making resins which comprises reacting in polymerizing proportions and in the presence of an amine catalyst the alkali metal salt of a polyhydric phenol with an aliphatic polyhalide in which the halogen atoms are all attached to different carbon atoms which are in turn joined to other atoms by single bonds only, and heating the reaction product in a molecular still.

10. A process for making resins which comprises reacting in polymerizing proportions and in the presence of an amine catalyst the alkali metal salt of a polyhydric phenol with an aliphatic polyhalide in which the halogen atoms are all attached to different carbon atoms which are in turn joined to other atoms by single bonds only, and further treating the reaction product by adding to a solution thereof in organic solvent a non-solvent for the resin and separating the resin which is thereby precipitated.

11. A tough highly viscous resin comprising the product obtained by substantially complete removal of the volatile products from the alkaline reaction product in the presence of an amine catalyst of a polyhydric phenol and an aliphatic polyhalide in which the halogen atoms are all attached to different carbon atoms which are in turn joined to other atoms by single bonds only.

JAMES AUGUSTUS ARVIN.